(12) United States Patent
Bingeser et al.

(10) Patent No.: US 10,871,181 B2
(45) Date of Patent: Dec. 22, 2020

(54) PROCESS FOR PRODUCING A CONNECTING ELEMENT AS WELL AS CONNECTING ELEMENT

(71) Applicant: RICHARD BERGNER VERBINDUNGSTECHNIK GMBH & CO. KG, Schwabach (DE)

(72) Inventors: Roland Bingeser, Nuremberg (DE); Helene Pramschuefer, Fuerth (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 739 days.

(21) Appl. No.: 15/190,405

(22) Filed: Jun. 23, 2016

(65) Prior Publication Data
US 2016/0377107 A1 Dec. 29, 2016

(30) Foreign Application Priority Data

Jun. 23, 2015 (DE) ........................ 10 2015 211 626

(51) Int. Cl.
*B21H 3/02* (2006.01)
*F16B 33/06* (2006.01)
(Continued)

(52) U.S. Cl.
CPC ............... *F16B 33/06* (2013.01); *B21H 3/02* (2013.01); *C23C 10/28* (2013.01); *C23C 10/30* (2013.01);
(Continued)

(58) Field of Classification Search
CPC ........ F16B 33/06; F16B 33/008; C23C 10/28; C23C 10/36; C23C 24/08; B21K 1/44;
(Continued)

(56) References Cited

U.S. PATENT DOCUMENTS 2,718,647 A * 9/1955 Raible ...................... B21G 3/18
411/424
2,962,813 A * 12/1960 Kreidler .................. B21C 23/22
156/244.12

(Continued)

FOREIGN PATENT DOCUMENTS

DE 2616720 A1 10/1976
DE 10323169 A1 12/2004
(Continued)

*Primary Examiner* — Edward T Tolan
(74) *Attorney, Agent, or Firm* — Laurence A. Greenberg; Werner H. Sterner; Ralph E. Locher

(57) ABSTRACT

In a method for producing a connecting element, in particular a bolt, a zinc anti-friction coating is applied to a blank made of a metallic base material. Subsequently, the coated blank is deformed in a deformation process to a desired final geometry of the bolt. The deformation process may, in particular, be a thread rolling process. The anti-friction coating is applied in particular by way of a zinc diffusion method. The bolt is in particular an engine bolt, specifically a connecting rod bolt. A bolt of this type has a durability as conventional bolts, but at the same time can be mounted repeatedly by virtue of the formation of the special anti-friction coating without the coefficients of friction increasing above permissible limits.

9 Claims, 1 Drawing Sheet

(51) Int. Cl.
  *C23C 28/00* (2006.01)
  *C23C 10/36* (2006.01)
  *C23C 10/28* (2006.01)
  *C23C 10/30* (2006.01)
  *C23C 10/60* (2006.01)
  *C23C 24/08* (2006.01)
  *C23C 30/00* (2006.01)
  *F16C 11/02* (2006.01)

(52) U.S. Cl.
  CPC .............. *C23C 10/36* (2013.01); *C23C 10/60* (2013.01); *C23C 24/08* (2013.01); *C23C 28/3225* (2013.01); *C23C 28/34* (2013.01); *C23C 30/00* (2013.01); *F16C 11/02* (2013.01)

(58) Field of Classification Search
  CPC .. B21K 1/56; B21H 3/02; B21H 7/002; B21C 23/22
  See application file for complete search history.

(56) References Cited

U.S. PATENT DOCUMENTS

| | | | | |
|---|---|---|---|---|
| 3,099,083 | A * | 7/1963 | De Long | C23F 13/02 29/428 |
| 3,301,120 | A * | 1/1967 | Loyd | F16B 35/00 148/587 |
| 3,620,119 | A * | 11/1971 | King, Jr. et al. | B21C 23/22 411/399 |
| 4,824,314 | A * | 4/1989 | Stencel | F16B 33/006 411/378 |
| 5,564,876 | A * | 10/1996 | Lat | B21G 3/20 411/439 |
| 7,051,645 | B2 | 5/2006 | Schenkel et al. | |
| 7,273,337 | B2 * | 9/2007 | Lat | B05D 1/60 29/458 |
| 7,950,885 | B2 * | 5/2011 | Rosenkranz | F16B 25/0026 411/258 |
| 8,020,529 | B2 | 9/2011 | Becker et al. | |
| 8,429,888 | B2 * | 4/2013 | Del Rio Rodriguez | D07B 1/0613 57/237 |
| 8,956,469 | B2 * | 2/2015 | Fuetterer | C23C 10/02 148/281 |
| 9,435,367 | B2 * | 9/2016 | Egele | F16B 25/00 |
| 2005/0109433 | A1 | 5/2005 | Danger et al. | |
| 2006/0228575 | A1 * | 10/2006 | Klos | C25D 5/48 428/621 |
| 2006/0237099 | A1 | 10/2006 | Schneider et al. | |
| 2009/0266454 | A1 | 10/2009 | Graf et al. | |
| 2009/0290953 | A1 | 11/2009 | Asai et al. | |
| 2013/0129444 | A1 * | 5/2013 | May | F16B 39/284 411/234 |
| 2013/0195580 | A1 * | 8/2013 | Kast | F16B 33/008 411/387.4 |
| 2016/0265116 | A1 | 9/2016 | Güttler et al. | |
| 2017/0089384 | A1 * | 3/2017 | Kazama | F16B 33/00 |

FOREIGN PATENT DOCUMENTS

| | | |
|---|---|---|
| DE | 10348086 A1 | 5/2005 |
| DE | 202005013320 U1 | 12/2006 |
| DE | 102006008910 A1 | 9/2007 |
| DE | 102008007977 A1 | 8/2009 |
| DE | 102014216790 A1 | 2/2016 |
| EP | 1612396 A2 | 1/2006 |
| WO | 2004099468 A1 | 11/2004 |
| WO | 2015055756 A1 | 4/2015 |

* cited by examiner

PROCESS FOR PRODUCING A CONNECTING ELEMENT AS WELL AS CONNECTING ELEMENT

BACKGROUND OF THE INVENTION

Field of the Invention

The invention relates to a method for producing a connecting element, in particular a bolt, made of a metallic base material, to which a coating made of a metallic material is applied. The invention also relates to a connecting element, in particular a bolt having such a coating.

In the case of connecting elements, in particular in the case of bolts, it is known in principle to apply a coating to a base material to form desired surface properties. For this purpose, different coating methods are known.

DE 10 2014 216 790.6, which was unpublished on the filing date, discloses a method for producing a bolt, in which a relatively high-grade coating is applied, in particular, to a lightweight metal base material. This bolt is intended in particular for use in lightweight construction, specifically in the case of CFRP components for avoiding contact corrosion. In this case, the coating is applied prior to the rolling of the thread.

In the case of bolts in regions which are subject to high levels of loading, in particular for example in the case of engine bolts, which are thus used in internal combustion engines for connecting components of the internal combustion engine, there is often the problem that said bolts cannot be tightened repeatedly or can only be tightened a few times with an intended tightening torque. On account of the high level of loading and the usually high tightening torques, high-strength bolts, in particular made of steel, are used as engine bolts.

Before the bolt is used for the first time, an anti-friction coating is therefore often applied thereto. It is usually the case that the high-strength bolts are phosphated for this purpose, and additionally also lubricated. Engine bolts treated in this way can be loosened and tightened a few times.

However, there is generally the problem here that the applied coating entails the risk of embrittlement or damage to the bolt as a result of instances of local pickling attack or as a result of atomic hydrogen penetrating into the surface. The number of screwing operations is also typically limited to at most three screwing operations. A further problem can be seen in the specific phosphating method. To this end, specifically the bolts are circulated in a drum, and this can lead to mechanical damage to the thread prior to initial use.

Brief Summary of the Invention

Proceeding therefrom, the invention is based on the object of specifying a connecting element, in particular a bolt, specifically a high-strength engine bolt, and also a method for the production thereof, which has good anti-friction properties for multiple tightening.

According to the invention, the object is achieved by a method for producing a connecting element, in particular a bolt, having the features of the method claims, and also by a connecting element as claimed. The features specified in respect of the method can also be transferred analogously to the connecting element, and vice versa.

The connecting element in this respect comprises a main body made of a metallic base material, to which a coating made of a metallic material is applied. In this respect, the metallic material of the coating which is selected is zinc or a zinc alloy, which is applied during production to a blank consisting of the base material in order to form an anti-friction coating. Subsequently, the blank coated in this way is deformed to a desired final geometry in a deformation process. Accordingly, the finished connecting element also comprises an anti-friction coating made of zinc or a zinc alloy, which is applied to a main body made of the base material. For the application of the anti-friction coating, it is possible to use, for example, chemical or physical coating methods known per se for applying such zinc coatings, as are known to a person skilled in the art, in order to produce an in particular uniform and homogeneous coating.

This configuration is based on the consideration of forming a zinc-based anti-friction coating which can be applied in a particularly durable manner, instead of the phosphating which has been routine to date. It is of further particular importance here that the anti-friction coating is formed just before the in particular last deformation process of the connecting element. Specifically when the connecting element is in the form of a bolt, the anti-friction coating is therefore applied in particular before the formation of the thread. This ensures that there is no mechanical loading and therefore no risk of mechanical damage to the thread which is formed after the application of the anti-friction coating. The selection of a zinc-based anti-friction coating ensures as a whole multiple, repeated loosening and tightening of the bolt, even in the case of bolts subject to high levels of loading.

The introduction of heat is usually necessary for applying the coating. A further decisive aspect in the method described here, in which the coating is applied before the deformation process to form the final geometry, can be seen in the fact that desired improvements in terms of properties which are brought about during the deformation process are retained, and are not nullified again by subsequent heat treatment.

The deformation process is preferably cold-forming. It is the case in particular that residual compressive stresses are introduced during this cold-forming. In the case of the application of the bolt, this is particularly advantageous, since the durability of the bolt as a whole is increased considerably by the residual compressive stresses introduced when forming the thread, for example by a thread rolling operation. This is of particular importance specifically in the case of bolts which are subject to high levels of loading, in particular in the case of engine bolts.

The anti-friction coating in this case is preferably formed as a diffusion layer, i.e. it is applied with the aid of a diffusion method. For this purpose, the metallic material is preferably brought into contact with the blank in powder form at an elevated temperature, such that the metallic material penetrates at least partially into the base material of the blank by virtue of a diffusion process. A temperature in the range of 250° C. to 500° C. is established in particular here under an elevated temperature.

A diffusion method of this type for forming a zinc coating is known in principle for vehicle body components, for example from DE 10 2008 007 977 A1. This specific method is generally also known under the term diffusion galvanizing or thermal diffusion galvanizing. The metallic material present in powder form, referred to hereinafter also as zinc powder, is in this case usually added together with an inert filler, such as for example quartz sand or corundum, to the connecting element jointly in a container. As a result of the elevated temperature, zinc evaporates and diffuses into the metal substrate, where on the surface it forms an alloy with very good bonding properties comprising the constituents zinc and the base material, in particular iron/steel.

As a whole, the method described here forms a fixed, highly homogeneous anti-friction coating with a defined coefficient of friction. In the preferred case of application of a bolt, this comparatively durable anti-friction coating—compared to conventional phosphated bolts—preferably allows for the bolt to be tightened up to 10 times with the intended tightening torque, to be precise within defined coefficient of friction limits. At the same time, the properties required for the durability are retained.

With respect to a method which is as efficient as possible, it is provided here that a multiplicity of blanks are introduced together with the zinc powder into a container, said container being moved during the coating method so as to achieve good mixing between the blanks and the zinc powder in order to form an anti-friction coating with the greatest possible homogeneity. Here, the container is, for example, a shaking flask and in particular a drum which rotates during the process.

As has already been mentioned, the connecting element is in particular a bolt having a shank region and a head region. Expediently, the blank already has a shank region and a head region and a thread is formed into the shank region of the blank after the coating. This is usually effected with the aid of a cold-forming method, such as for example rolling.

The general procedure for producing bolts is usually such that firstly individual pre-blanks are cut to length from a rod-shaped strand consisting of the base material, these pre-blanks then being deformed, in particular upset, in a first rough deformation process for forming the head region in order to form the blank. During the production method, the rod-shaped starting material, the pre-blank or else the blank are subjected to thermal treatments, for example for hardening.

Expediently, however, no further thermal treatment step is effected after the formation of the thread; after the thread has been formed, the bolt is therefore not exposed in particular to a temperature above 100° C., for example, and specifically a temperature above 220° C. This ensures that the residual compressive stresses introduced during the deformation process are not undesirably degraded again and therefore the durability is not lost again.

Expediently, an anti-friction lubricant is also applied to the anti-friction coating after the formation of the final geometry, i.e. in particular after the thread rolling. This anti-friction lubricant involves, for example, oils or what are termed dry lubricants/sealants. This anti-friction lubricant is used to set a defined coefficient of friction, such that defined friction conditions are present when the bolt is being fastened and therefore also prespecified, defined tightening torques can be reliably observed. The latter is of significant importance particularly in the case of automated assembly. An anti-friction lubricant of this type is applied, for example, in a dipping method with subsequent drying, e.g. at elevated temperatures around 80° C.

During this method, the anti-friction coating is applied with a layer thickness in the range of 5 µm to 30 µm. This comparatively thin coating is sufficient here to form the desired anti-friction properties. At the same time, the method selected here ensures a reliable bond of the anti-friction coating on the base material.

The subsequent deformation process changes the layer thickness here in the deformed component regions. The anti-friction coating applied homogeneously to the blank originally with a uniform thickness therefore has a varying layer thickness as a characterizing feature of the method described here, in which the deformation to provide the final geometry is effected after the coating has been applied.

Since stretching is effected during the thread rolling, i.e. stretched partial regions are formed in the thread region, the layer thickness is smaller in the shank region of the finished bolt, specifically in the thread region, than in the head region.

Expediently, the layer thickness in these stretched partial regions lies merely in the range of 1 µm to 15 µm and preferably merely in the range up to at most 10 µm. By contrast, in the partial regions free of deformation, i.e. in particular in the head region which is non-deformed after the application of the anti-friction coating, it amounts to the original applied layer thickness in the range of between 5 µm and 30 µm.

The bolt is furthermore what is termed a high-strength bolt. This is to be understood in particular as meaning bolts as are classified in DIN-IN ISO 898-1 in strength class 10.9. Specifically, these bolts have a strength of >1000 MPa.

The bolts are preferably engine bolts. In the installed final state, the bolts therefore connect two engine components of an internal combustion engine to one another. Specifically, the bolt is formed as a connecting rod bolt, and in the engine establishes the connection between a crankshaft and the connecting rod, which supports the piston protruding into the combustion chamber of the internal combustion engine.

Steel is preferably used here for the metallic base material. Alternatively, high-grade steel, titanium or else a nickel alloy are used. Lightweight construction metals, such as for example aluminum, magnesium and the alloys thereof, are by contrast preferably not used as the base material.

BRIEF DESCRIPTION OF THE SEVERAL VIEWS OF THE DRAWING

An exemplary embodiment of the invention will be explained in more detail hereinbelow with reference to the figures. These show, in simplified illustrations.

DESCRIPTION OF THE INVENTION

Figure 1:
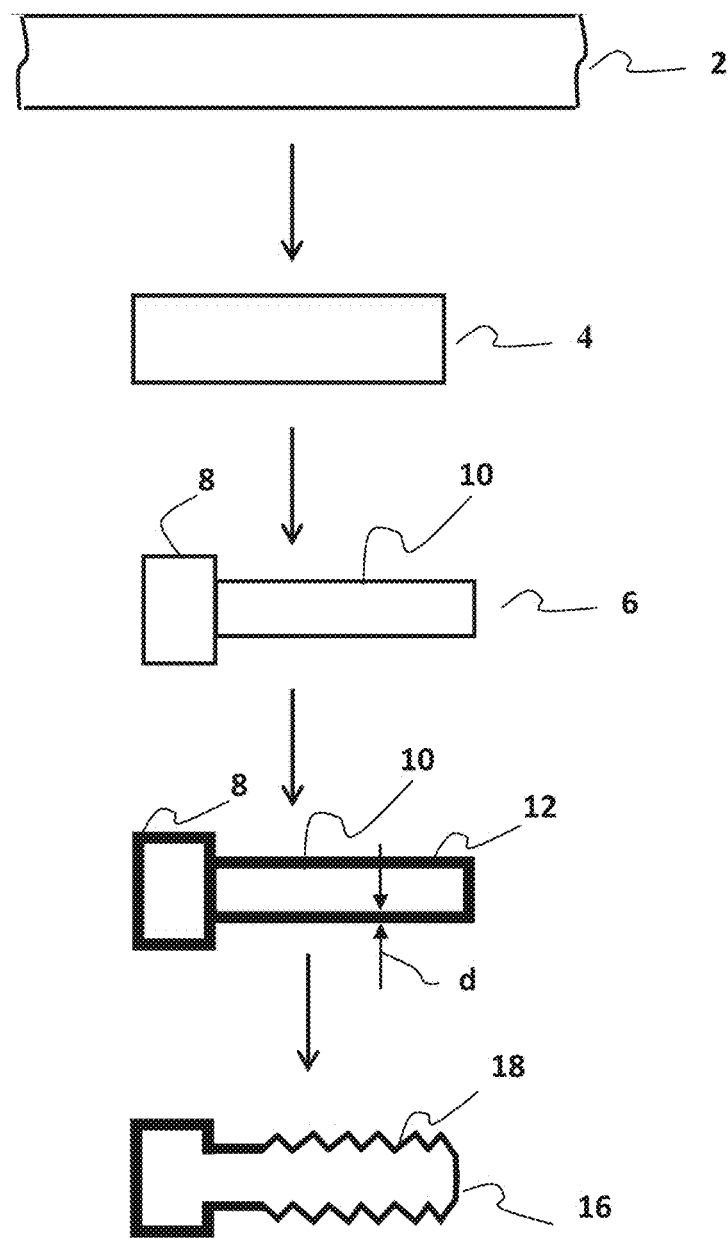
FIG. 1 the sequence of various process steps for producing a bolt provided with an anti-friction coating, and FIG. 2 an illustration, enlarged in sections, of a shank region of the bolt provided with a thread.

In a first step, provision is firstly made of a raw body, in particular a raw wire 2 which is produced as bulk goods and is made of a base material, in particular steel. A bolt-shaped pre-blank 4 is produced by being cut to length from this raw wire 2. Said pre-blank is subsequently formed into a blank 6 in a first deformation operation. To this end, the pre-blank 4 is deformed by an upsetting operation in such a manner as to form a head region 8 with an adjoining shank region 10.

A zinc anti-friction coating 12 is then applied to the blank 6 with a layer thickness d. In this respect, a zinc diffusion method is used to form the anti-friction coating 12. In this case, a multiplicity of blanks 6 are preferably introduced together into a rotating drum together with a zinc powder and usually in addition with further inert particles, such as for example quartz sand or corundum. The blanks 6 are heated together with the zinc powder inside the drum, typically to temperatures in the range of 250° C. to at most 600° C., usually up to at most 500° C. On account of the low melting point of the zinc, the latter already evaporates at approximately 300° C. and diffuses into the base material of the blank 6. A zinc-iron alloy is formed on the surface. One particular advantage of this method can be seen in the fact that on the one hand a highly homogeneous, uniform zinc anti-friction coating 12 with good bonding properties is formed, it being possible for said zinc anti-friction coating to be applied in addition in a cost-effective and reliable manner by the zinc diffusion method described here.

After the coating operation, the blank 6 is coated completely by the anti-friction coating 12 with a constant layer thickness d. In particular, it is therefore the case that both the shank region 10 and the head region 8 are coated uniformly with a homogeneous layer thickness d. The end faces both of the shank region 10 and of the head region 8 are preferably also coated by the coating 12.

Following the coating operation, the coated blank 6 is subjected, in a subsequent process step, to a final deformation process, such that the desired final geometry is produced and the finished bolt 16 is formed. This last deformation process is a rolling process for forming a thread 18.

Finally, in a manner which is not shown in greater detail here, an anti-friction lubricant is preferably also applied to the anti-friction coating 12. This is used to set a defined coefficient of friction for the intended purpose of use and the intended material pairing between the bolt and the component to be connected.

Figure 2:
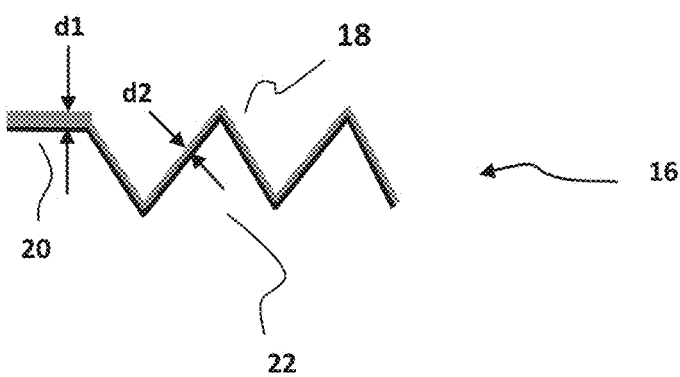

FIG. 2 shows a greatly simplified and enlarged sectional illustration of the shank region 10 of the bolt 16. The shank region 10 generally has a typically cylindrical partial portion which is oriented in relation to the head region 8 and which defines a thread-free region 20, and also a thread region 22 in the front partial portion. Since the thread-free region 20 is no longer deformed during the final deformation, i.e. during the rolling of the thread 18, said thread-free region 20 is also referred to as a non-deformed partial region. By contrast, the thread region 22 forms a deformed partial region. The terms "deformed partial region" and "non-deformed partial region" relate in this respect to the deformation operation after the coating 12 has been applied.

Owing to the thread forming, the deformed partial region is a stretched partial region, i.e. this involves the coated blank 6 being subjected to stretching during the deformation process.

On account of the deformation, the layer thickness d of the coating 12 varies. It has a first layer thickness d1 in the thread-free, non-deformed partial region 20, and therefore in particular also generally in the head region 8, and a second layer thickness d2 in the thread region 22. On account of the deformation-free zone, the first layer thickness d1 corresponds here to the originally applied layer thickness d. This typically lies in the range between 5 μm and 30 μm. By contrast, the second layer thickness d2 is reduced in the deformed thread region 22 and merely still has, by way of example, a layer thickness d2 in the range of 1 μm to at most 10 μm. The layer thickness d generally varies depending on the degree of deformation in the deformed partial region 22. Different degrees of deformation and therefore variations in the layer thickness d can also arise within the deformed thread region 22. The highest degree of deformation typically arises in the region of a thread base, and therefore the layer thickness d is smaller in the thread base than at the thread flanks. For the sake of simplicity, the illustration of a varying layer thickness d within the thread region 22 has been dispensed with in the exemplary embodiment.

The described bolt 16 with the applied zinc anti-friction coating 12 is preferably used as an engine bolt, in particular as a connecting rod bolt. This is generally a high-strength bolt which is designed for applications which experience high levels of loading.

A durably effective anti-friction coating 12 which as a whole is highly homogeneous is formed in a procedurally relatively simple and relatively cost-effective manner by the specific production method described here and the use of the zinc diffusion method.

This new coating 12 firstly allows for repeated tightening of the bolt up to deformation, i.e. up to the usually required tightening torque. As a whole, tightening with the required tightening torque which can be repeated at least five times and preferably up to ten times is made possible with such bolts, the coefficient of friction for all repeated tightening operations lying within a permissible, prespecified tolerance range and not exceeding a defined upper limit value. In the case of conventional bolts, which are phosphated, for example, it was possible to date to perform tightening merely three times until deformation.

In the case of further assembly, the coefficient of friction in the case of conventional bolts rises above permissible limits and the component would have to be exchanged. The long-term usability is therefore increased by the specific zinc anti-friction coating 12 described here.

A further significant advantage of the bolt 16 described here can also be seen in the fact that the anti-friction coating 12 is applied before the thread rolling operation, and therefore the residual compressive stresses introduced by the rolling operation are not reduced again by the elevated temperature during the coating. The required mechanical properties are therefore retained by the method described here, and therefore an adequate durability is ensured.

LIST OF REFERENCE SIGNS

2 Raw wire
4 Pre-blank
6 Blank
8 Head region
10 Shank region
12 Anti-friction coating
16 Bolt
18 Thread
20 Thread-free partial region
22 Thread region
d, d1, d2 Layer thickness of the coating

The invention claimed is:

1. A method for producing a bolt, the method comprising:
providing a blank of a metallic base material, the blank having a shank region and a head region;
after providing the blank that has the shank region and the head region, applying a coating of zinc or zinc alloy on the blank as an anti-friction coating to form a coated blank; and
after applying the anti-friction coating on the blank, forming a thread into the shank region.

2. The method according to claim 1, wherein the applying step comprises applying the anti-friction coating by a zinc diffusion method, and thereby bringing the metallic material into contact with the blank in powder form at an elevated temperature, and causing the metallic material to penetrate into the base material of said blank by virtue of a diffusion process.

3. The method according to claim 1, which comprises not subjecting the bolt to any further thermal treatment after forming the thread.

4. The method according to claim 1, which comprises applying an anti-friction lubricant to the anti-friction coating to set a defined coefficient of friction.

5. The method according to claim 1, which comprises applying the anti-friction coating with a layer thickness in a range of 5 μm to 30 μm before forming the thread.

6. The method according to claim 1, which comprises:
providing a raw wire;
forming a bolt-shaped pre blank;
forming the blank by deforming the pre blank to form the head region and the shank region;
subjecting the raw wire, the pre blank, or the blank to a thermal treatment for hardening;
after the thermal treatment, applying the anti-friction coating such that the coating has a layer thickness in a range between 5 μm and 30 μm; and
after applying the anti-friction coating, forming the thread into the shank region by a cold-forming method without performing any additional thermal treatment with temperatures greater than 220° C. after forming the thread.

7. The method according to claim 6, wherein the step of applying the anti-friction coating includes introducing the blank together with additional blanks and the zinc powder into a rotating drum.

8. The method according to claim 7, wherein the anti-friction coating allows for repeated tightening of the bolt up to deformation from at least five times and up to ten times.

9. The method according to claim 2, wherein the step of applying the anti-friction coating includes introducing the blank together with additional blanks and the zinc powder into a rotating drum.

* * * * *